United States Patent [19]

Hashimoto et al.

[11] Patent Number: 4,889,677

[45] Date of Patent: Dec. 26, 1989

[54] PROCESS FOR CURING TIRE EMPLOYING A BLADDER LUBRICANT

[75] Inventors: Takatsugu Hashimoto, Higashiyamato; Seisuke Tomiya, Tokorozawa, both of Japan

[73] Assignee: Bridgestone Corporation, Tokyo, Japan

[21] Appl. No.: 200,963

[22] Filed: Jun. 1, 1988

Related U.S. Application Data

[63] Continuation-in-part of Ser. No. 889,840, Jul. 28, 1986, abandoned.

[30] Foreign Application Priority Data

Jul. 29, 1985 [JP] Japan ............................ 60-167330
Feb. 15, 1986 [JP] Japan ............................ 61-29919

[51] Int. Cl.$^4$ .................. B28B 7/36; B29C 35/02; B29C 33/64
[52] U.S. Cl. ..................... 264/297.5; 264/315; 264/338; 249/115; 252/49.5; 106/38.22; 106/287.1
[58] Field of Search ............ 264/315, 338, 314, 297.5; 249/115; 252/49.5; 106/38.22, 287.1, 38.24, 287.14, 287.16

[56] References Cited

U.S. PATENT DOCUMENTS

| | | | |
|---|---|---|---|
| 4,043,924 | 8/1977 | Traver | 252/21 |
| 4,359,340 | 11/1982 | Comper et al. | 106/38.22 |
| 4,547,544 | 10/1985 | Allardice | 524/267 |
| 4,554,122 | 11/1985 | Allardice | 264/130 |
| 4,678,815 | 7/1987 | Hoffman | 523/122 |

*Primary Examiner*—Jan H. Silbaugh
*Assistant Examiner*—Neil M. McCarthy
*Attorney, Agent, or Firm*—Birch, Stewart, Kolasch & Birch

[57] ABSTRACT

A method of molding and vulcanizing more than 40 rubber products successively by using a curing bladder, which has been treated at the surface thereof with a silicone composition including:

(a) 100 parts by weight of a polyorganosiloxane composed mainly of polydimethylsiloxane with a viscosity at 25° C. of from 3,000 to 5,000,000 cst, (b) from 30 to 300 parts by weight of a polymethylhydrogensiloxane with a viscosity at 25° C. of from 10 to 70 cst, (c) from 2 to 25 parts by weight of a finely powderous silica, and, (d) from 0 to 30 parts by weight of an organic acid salt of one or more of metals selected from the group consisting of zinc, magnesium, manganese and cobalt.

12 Claims, No Drawings

PROCESS FOR CURING TIRE EMPLOYING A BLADDER LUBRICANT

This invention is a continuation-in-part of the co-pending application Ser. No. 889,840 filed on July 28, 1986 now abandoned.

BACKGROUND OF THE INVENTION

1. Field of the Invention

This invention concerns a process for curing a tire using a curing bladder.

2. Description of the Prior Art

Pneumatic rubber tires for use in vehicles have heretofore been produced by molding and curing green tires in a molding press, in which the green tires are pressed outwardly to the surface of a die by an internal fluid-expanded bladder. In this method, the green tire is molded and vulcanized conforming the surface of an external die that determines the tred pattern and the side wall structure of the tire.

Heretofore, organic rubber, particularly, butyl rubber has been used as the composition of the curing bladder for use in the molding and vulcanization of rubber tire products. However, a curing bladder composed of an organic rubber such as butyl rubber has poor releasability from the inner surface of the tire and tends to be bent upon detaching the tire, thus causing failure upon tire molding in the die. Further, the surface of the bladder is roughened by the abrasion and possibly adheres to the inner surface of the tire after the curing of the tire or in the course of bladder shrinkage during the tire curing cycle. In addition, gas bubbles are confined between the bladder and the tire surface to render the heat transfer insufficient, thereby promoting the defects in the vulcanization of the tire.

In view of the above, a releasing agent such as one composed of a silicon emulsion has been required in the conventional curing bladder in order to improve the lubricating nature to the inner surface of the tire. However, application of the releasing agent to the inner surface of the tire provides disadvantages in that the number of steps is increased in view of the manufacturing process and intermediate stocks are increased, as well as the releasing agent gives undesired effect upon tire molding and vulcanization, thereby often resulting in failed products.

As a countermeasure for overcoming such problems, there has been attempted a method of modifying the surface of the organic rubber constituting the curing bladder with silicone and the use of methyl hydrogen silane or dimethyl hydrogen silane (Japanese Patent Application Laid-Open No. 57-111394) or the use of hydroxyl silane (Japanese Patent Application Laid-Open Nos. 57-111393 and 119992).

However, in the conventional methods of applying surface modifications to the organic rubber with silicone as described above, although the releasability between the surface of the bladder and the inner surface of the tire can be improved and the tire can be molded and vulcanized without using the releasing agent, the durability of the surface of the bladder is extremely worsened, making it unsuitable for practical use. Therefore, it has been desirable to develop a curing bladder having excellent physical properties such as mechanical strength, heat resistance and hydrothermal resistance, as well as excellent releasability.

SUMMARY OF THE INVENTION

It is an object of this invention to provide a method of molding and vulcanizing tires capable of improving the durability of a curing bladder and enhancing the workability and the stability in the quality of the tires obtained.

The above object of this invention can be attained by a method of molding and vulcanizing a rubber product by using a curing bladder, wherein said bladder is treated at the surface thereof with a silicone composition comprising:

(a) 100 parts by weight of a polyorganosiloxane having a viscosity at 25° C. of from 3,000 to 5,000,000 cst, said polyorganosiloxane having organic groups bonded to the silicone atoms of said polyorganosiloxane, said organic groups being selected from the group consisting of methyl, ethyl, propyl, butyl, pentyl, hexyl, octyl, decyl, vinylphenyl, $\beta$-phenylethyl, $\beta$-phenylpropyl, chloromethyl, chlorophenyl and 3,3,3-trifluoropropyl, and wherein more than 90 mol % of said organic groups are methyl;

(b) from 30 to 300 parts by weight of a polymethylhydrogensiloxane having a viscosity at 25° C of from 10 to 70 cst;

(c) from 2 to 25 parts by weight of finely powderous silica, and (d) from 0 to 30 parts by weight of an organic acid salt of one or more metals selected from the group consisting of zinc, magnesium, manganese and cobalt, and wherein said polyorganosiloxane (a) and said polymethylhydrogensiloxane (b) consist the silicone component of said silicone composition.

The present inventors have made an earnest study for improving the performance of silicone films formed on the surface of the curing bladder and, as a result, have accomplished this invention based on findings that the curing bladder applied with a surface treatment by using a silicone surface treating solution containing a silicone composition comprising a polyorganosiloxane mainly composed of dimethylpolysiloxane having a specific viscosity reinforced with finely powderous silica, a polymethylhydrogensiloxane of a specific viscosity and, optionally, a specific metal organic acid salt is extremely excellent both for the releasability and the endurance.

Since the curing bladder treated at its surface with a surface treating silicone solution containing (a) the specific polyorganosiloxane, (b) the specific polymethylhydrogensiloxane, (c) finely powderous silica and, if required, (d) the specific metal organic acid salt is excellent in releasability, as well as extremely excellent in physical properties such as heat resistance, hydrothermal resistance and durability, the method of molding and vulcanizing the rubber product such as a tire by using the thus surface treated curing bladder according to the invention, it is possible to:

(1) mold and vulcanize products without using the releasing agent, (2) improve significantly the yield with no substantial development of failed molding products, and (3) increase the working life of the vulcanizing bladder, and molding and vulcanization for the rubber products can be performed at a reduced cost and efficiently.

In this case, rubber products can be molded and vulcanized successively more than 20 times by using the bladder treated with the silicone composition without any releasing agents, and, if required, the bladder is treated again with the silicone composition to mold and vulcanize rubber products successively more than 20 times again.

The above and other objects, features and advantages of this invention will be more apparent from the following description.

DETAILED DESCRIPTION OF THE INVENTION

The curing bladder for use in this invention is surface treated with a silicone surface treating solution containing a silicone composition comprising (a) a polyorganosiloxane, (b) a polymethylhydrogensiloxane, (c) finely powderous silica and, optionally, (d) a metal organic acid salt.

The polyorganosiloxane as the ingredient (a) has a viscosity at 25° C. of 3,000 to 5,000,000 cst, preferably, 9,000 to 2,000,000 cst and, more preferably, 10,000 to 1,000,000 cst. If the viscosity at 25° C. of the polyorganosiloxane is lower than 3,000 cst, the releasing life of the thus treated vulcanizing bladder is remarkably poor. While on the other hand, if it exceeds 5,000,000 cst, the bladder is readily defoliated mechanically.

Any of polyorganosiloxanes may be used so long as their viscosity at 25° C. lies within the above specified range and they may be used solely or in admixture.

The polyorganosiloxane (a) used in this invention is, preferably, substantially a linear polyorganosiloxane but those partially having branched or network structures may also be used. Although there are no particular restrictions for the terminal functional groups of the polyorganosiloxane, they are, desirably, hydroxyl groups or hydrogen groups.

Organic groups bonded to the silicone atoms in the polyorganosiloxane (a) can include alkyl groups such as methyl, ethyl, propyl, butyl, pentyl, hexyl, octyl and decyl; alkenyl groups such as vinyl; aryl groups such as phenyl; aralkyl groups such as $\beta$-phenylethyl and $\beta$-phenylpropyl; as well as halogenated hydrocarbon groups such as chloromethyl, chlorophenyl and 3,3,3-trifluoropropyl. It is preferred that more than 90 mol %, more preferably more than 95 mol %, of the organic groups are methyl groups, in view of the easy synthesis for attaining various properties such as heat resistance as the silicone and releasability provided to the curing bladder is obtained.

The polymethylhydrogensiloxane as the ingredient (b) has a viscosity at 25° C. of from 10 to 70 cst, preferably, 30 to 60 cst. If the viscosity at 25° C. is less than 10 cst or greater than 70 cst, the releasability of the curing bladder obtained is undesirably poor. Further, the boiling point of the compound is desirably higher than 20° C. and, more preferably, higher than 40° C. in view of the workability.

The amount of the ingredient (b) used in this invention is from 30 to 300 parts by weight and, preferably, from 60 to 180 parts by weight based on 100 parts by weight of polyorganosiloxane as the ingredient (a). If the amount used is less than 30 parts by weight or more than 300 parts by weight, the releasability of the curing bladder obtained is poor.

Suitable average particle size of the finely powderous silica as the ingredient (c) is from 5 to 50 m as measured by an electron microscope. Finely powderous silica hydrophobicized at the surface with organic silicone compounds, etc. may also be used.

The amount of the finely powderous silica as the ingredient (c) is within the range from 2 to 25 parts by weight, preferably, from 3 to 15 parts by weight and, more preferably, from 3 to 10 parts by weight based on 00 parts by weight of the polyorganosiloxane as the ingredient (a). If the amount of the finely powderous silica is less than 2 parts by weight, no sufficient releasing life can be obtained for the curing bladder. While on the other hand, if it exceeds 25 parts by weight, it is not practical because of remarkable sedimentation of the finely powderous silica.

One or more of the metals selected from the group consisting of zinc, magnesium, manganese and cobalt is used as the metal for the metal organic acid salt as the ingredient (d), and the use of zinc or magnesium is particularly preferred in view of the releasing life of the curing bladder obtained. Further, the organic carboxylic acids used contain carbons preferably from to 25 and, more preferably, from 7 to 18 in view of the workability and the releasing life. Particularly, aliphatic carboxylic acids such as octanoic acid, lauric acid, octenoic acid, myristic acid, palmitic acid, stearic acid and oleic acid may be preferably used as the organic acid. The ingredient (d) is not always necessary but may be saved depending on the case in this invention. The amount of the ingredient (d) used is from 0 to 30 parts by weight, preferably less than 10 parts by weight, more preferably less than 5 parts by weight based on 100 parts by weight of polyorganosiloxane as the ingredient (a).

The surface treating silicone solution according to this invention can optionally be blended with reinforcing or not-reinforcing fillers. The fillers can include, for example, fumed silica, precipitated silica, silica aerogel, pulverized quartz, diatomaceous earth, titanium oxide, zinc oxide, magnesium carbonate, aluminum sulfate, barium sulfate, mica, asbesto, glass powder and carbon black. The surface of the fillers may be hydrophobicized by treating with an organic silicone compound and the like. Further, known heat resistance improvers, chemical resistance improvers, thickeners, pH adjusting agents, rust inhibitors, stabilizers, flame retardants, pigments, flavors and the like may also be blended therewith.

The surface treating silicone solution according to this invention can be used by adding the silicone composition in an organic solvent or in water to make an emulsion.

In this case, any of organic solvents can be used with no particular restrictions so long as they can dissolve polyorganosiloxane (a). For example, they include petroleum ether, benzine, mineral turpentine, gasoline, kerosene, naphtha, illuminating kerosene, light oil, cyclohexane, benzene, toluene, xylene, methyl chloride, methylene chloride, chloroform, carbon tetrachloride, trichloroethylene, $CCl_2F_2$, $CCl_2F$-$CCl_2F$, $CCl_2F$-$CClF_2$, perchloroethylene, 2-ethyl-hexanol, lauryl alcohol, ethyl ether, methyl ethyl ketone, methyl isobutyl ketone etc.

These organic solvents may desirably be changed depending on the processing temperature for the curing bladder. It is preferred to use those organic solvents having boiling points usually of from 20° to 70° C. in the case of treating under room temperature and use those organic solvents with boiling points of from $-10°$ C. to $+70°$ C. relative to the setting temperature for the vulcanizing and molding of rubber in the case of processing at a high temperature condition.

Further, in tee case of using the surface treating silicone solution as in the form of aqueous emulsion, it is preferred to stably emulsify the silicone composition in water by blending a surface active agent. Usually, a nonionic type surface active agent is used but an anionic or cationic type agent may also be used.

The silicone composition in the surface treating silicone solution according to this invention comprises the ingredients (a) to (c) or (a) to (d) as described above, optionally as well as other additives. The total concentration of the silicone composition in the surface treating silicone solution is from 2 to 45 % by weight. If the concentration is less than 2 % by weight, much time is taken for formation of the silicone films and the wetting between the bladder substrate and the rubber surface is extremely poor, which significantly worsens the releasing life. Further, if the concentration exceeds 45 % by weight, processing workability becomes poor and the silicone films become excessively thick to provide undesired effects on the quality at the inner surface of the tire. The more preferable total concentration of the silicone composition is in the range of from 5 to 40 % by weight for the surface treating silicone solution in the form of aqueous emulsion and in the range of from 2 to 25 %, preferably 2 to 15 % by weight for the surface treating silicone solution in the form of the organic solvent solution.

The method of molding and vulcanizing the rubber product such as a tire according to this invention uses a curing bladder treated with the surface treating silicone solution as described above and formed at the surface with the films of the silicone composition. The curing bladder is usually treated under room temperature before incorporated into the vulcanizing molding machine but it may be treated under high temperature conditions after incorporated into the vulcanizing molding machine. Further, the above treatings may be carried out in combination. The bladder may preferably be formed from butyl rubber.

The method of molding and vulcanizing the rubber product according to this invention is performed by providing materials to be molded to the inside of a molding die incorporated with a curing bladder surface treated with the above surface treating silicone solution and formed at its surface with the films of the silicone composition and carrying out heating under pressure with other production conditions usually employed.

As described above, the surface treating silicone solution for use in this invention comprises (a) a polyorganosiloxane, (b) a polymethylhydrogensiloxane, (c) a finely powderous silica and, optionally, (d) a metal organic acid salt can form favorable silicone surface films on the surface of the curing bladder. The thus formed silicone surface films are excellent in releasability, as well as extremely excellent in physical properties such as mechanical strength, heat resistance, hydrothermal resistance and durability.

Accordingly, by the method of this invention using such a curing bladder, generation of failed molding products can significantly be reduced and the rubber products can be molded and vulcanized at good efficiency with an excellent appearance.

According to the present invention, rubber products can be molded and vulcanized successively more than 20 times, preferably more than 30 times, more preferably more than 40 times by using the bladder treated with the silicone solution without any releasing agents. In this case, the bladder which has been used for curing rubber products successively may be treated with the silicone solution again in order to extend its life. More detailedly, after rubber products are molded and vulcanized successively more than 20 times, preferably more than 30 times, more preferably more than 40 times by using the bladder treated with the silicone solution without any releasing agents, the bladder used is treated again with the silicone solution to mold and vulcanize rubber products successively more than 20 times preferably more than 30 times, more preferably more than 40 times again.

Further, the surface treating silicone solution according to this invention has a preferable releasing performance and can desirably be used as the treating agent for the curing bladder as described above. It can also be utilized broadly, such as for the releasing agent, surface protecting agent of rubber products and mold releasing agent.

This invention will now be described more specifically referring to examples and comparative example, but the invention is not limited only to the following examples unless it goes out of the gist of this invention.

EXAMPLES 1 and 2

The surface treating solution having the formulation shown in Table 1 was coated by brushing on a curing bladder mainly composed of butyl rubber, dried for 20 to 30 minutes and again coated by brushing and then dried in a room temperature atmosphere to completely evaporate the solvent.

Further, the surface treating solution having the formulation shown in Table 2 was coated in the same procedures as described above, dried for 120 - 140 minutes, coated again by the brushing and then dried in the room temperature atmosphere to completely evaporate the solution.

When the non-treated tires were molded and vulcanized by the conventional method repeatedly using these surface treating bladders but without using releasing agent, molding and vulcanization for the tires could be performed extremely smoothly cases up to 50 to 70 cycles for both of the case, during which re-coating for the bladder with the silicone composition was not necessary.

TABLE 1

|  | (parts by weight) |
|---|---|
| Polydimethyl siloxane *1 | 100 |
| Polymethylhydrogensiloxane *2 | 60 |
| Finely powderous silica *3 | 6 |
| Zinc laurate | 0.5 |
| Magnesia | 5 |
| Petroleum type solvent *4 | 3000 |

*1: viscosity (25° C.) = $1.0 \times 10^5$ (cst)
*2: viscosity (25° C.) = 30 (cst)
*3: particle diameter = 25 μm
*4: boiling point = 50–60° C.

TABLE 2

|  | (parts by weight) |
|---|---|
| Polydimethyl siloxane *1 | 100 |
| Polymethylhydrogensiloxane *2 | 60 |
| Finely powderous silica *3 | 6 |
| Zinc laurate | 0.5 |
| Magnesia | 5 |
| Polyethylene glycol monostearate (molecular weight 400) | 10 |
| Water | 2000 |

*1: viscosity (25° C.) = $1.0 \times 10^5$ (cst)
*2: viscosity (25° C.) = 30 (cst)
*3: particle diameter = 25 μm

EXAMPLES 3 and 4

Procedures of molding and vulcanizing non-treated tires for 40 cycles using the surface-treated bladders obtained by the methods as described in Examples 1 and 2 without using the releasing agent for both of the cases in the ordinary method, then coating the surface treating solutions shown in Tables 3 and 4 on the bladders respectively and molding the non-treated tires again for 40 cycles were repeated to fine that the releasing effect could be maintained till the working life of the bladders.

TABLE 3

|  | (parts by weight) |
| --- | --- |
| Polydimethyl siloxane *1 | 100 |
| Polymethylhydrogensiloxane *2 | 60 |
| Finely powderous silica *3 | 6 |
| Zinc laurate | 0.5 |
| Magnesia | 5 |
| Petroleum type solvent *5 | 3000 |

*1: viscosity (25° C.) = 1.0 × 10$^5$ (cst)
*2: viscosity (25° C.) = 30 (cst)
*3: particle diameter = 25 μm
*5: boiling point = 150–200° C.

TABLE 4

|  | (parts by weight) |
| --- | --- |
| Polydimethyl siloxane *1 | 100 |
| Polymethylhydrogensiloxane *2 | 60 |
| Finely powderous silica *3 | 6 |
| Zinc laurate | 0.5 |
| Magnesia | 5 |
| Polyethylene glycol monostearate (molecular weight 400) | 10 |
| Water | 2000 |

*1: viscosity (25° C.) = 1.0 × 10$^5$ (cst)
*2: viscosity (25° C.) = 30 (cst)
*3: particle diameter = 25 μm

COMPARATIVE EXAMPLE 1

When non-processed tires were molded and vulcanized in the same manner as in Example 1 by using the bladder treated at its surface with the composition as shown in Table 5 according to the procedures in Example 1 in Japanese Patent Application Laid-Open No. 57-111394, the bladder was closely adhered to the inner surface of the tires after 8 to 16 cycles and could be used no more.

TABLE 5

|  | (parts by weight) |
| --- | --- |
| Polydimethyl siloxane *6 | 40.4 |
| Polymethylhydrogensiloxane *7 | 175.0 |
| Zinc acetate/zinc stearate *8 | 43.7 |
| Defoamer *9 | 1.3 |
| Water | 610.8 |

*6: Mixture of 30.7 parts by weight of hydroxyl-incorporated polydimethyl siloxane and 10.9 parts by weight of surface active agent. Viscosity (25° C.) = 20 × 10$^6$ (cst)
*7: 30% by weight of a mixture of methyl hydrogen silane (viscosity at 25° C. = 30 (cst)) and dimethyl hydrogen silane (viscosity at 25° C. = 100 (cst)) and 70% by weight of water.
*8: 20% by weight of a mixture of zinc acetate and zinc stearate and 80% by weight of water.
*9: Aqueous emulsion composition of dimethyl polysiloxane.

From the results of Examples 1 to 4 and Comparative Example 1, it can be recognized that the tires can be manufactured at an extremely high efficiency by the method according to this invention.

EXAMPLES 5 to 24, COMPARATIVE EXAMPLES 2 to 19

Each of the surface treating solutions having the formulations shown in Tables 6 to 8 was coated by brushing on a curing bladder mainly composed of butyl rubber, dried for 20 to 30 minutes in the case of using petroleum type solvent or for 120 to 140 minutes in the case of using water as a solvent, again coated by brushing, and then dried in a room temperature atmosphere to completely evaporate the solvent.

When non-treated tires were molded and vulcanized by the conventional method repeatedly using these surface treating bladders but without using releasing agent.

Tables 6 to 8 show the results of cycle numbers which reveals how often tires can be molded and vulcanized repeatedly by using the above bladders without trouble. The evaluation criteria in the Tables are as follows:

○ : Molding and vulcanization for the tires could be performed very smoothly up to the cycle number shown in the Tables during which re-coating for the bladder with the silicone composition was not necessary.

X : The film on the bladder was partially removed and gathered after the cycle number shown as G in the Tables, and then the gathered film was closely adhered to the tires after the cycle number shown as CA in the Table.

XX : The bladder was closely adhered to the inner surface of the tires after the cycle number shown in the Tables and could be used no more.

From the results of Tables 6 to 8, it can be recognized that the tires can be manufactured at an extremely high efficiency by the method according to this invention, i.e. the use of a bladder which is treated at the surface thereof with a silicone composition comprising:
(a) 100 parts by weight of a polyorganosiloxane with a viscosity at 25° C of from 3,000 to 5,000,000 cst,
(b) from 30 to 300 parts by weight of methyl hydrogen polysiloxane, and
(c) from 2 to 25 parts by weight of finely powderous silica.

TABLE 6

| Example and Comparative Example | C2 | C3 | E5 | E6 | E7 | E8 | E9 | E10 | E11 | E12 | E13 | E14 | C4 | C5 |
| --- | --- | --- | --- | --- | --- | --- | --- | --- | --- | --- | --- | --- | --- | --- |
|  |  |  |  |  |  |  | parts by weight |  |  |  |  |  |  |  |
| Polydimethyl siloxane *1 | 100 | 100 | 100 | 100 | 100 | 100 | 100 | 100 | 100 | 100 | 100 | 100 | 100 | 100 |
| Polymethylhydrogen siloxane*2 | 0 | 0 | 40 | 40 | 60 | 60 | 90 | 90 | 150 | 150 | 250 | 250 | 350 | 350 |
| Finely powderous silica *3 | 6 | 6 | 6 | 6 | 6 | 6 | 6 | 6 | 6 | 6 | 6 | 6 | 6 | 6 |

TABLE 6-continued

| Example and Comparative Example | C2 | C3 | E5 | E6 | E7 | E8 | E9 parts by weight | E10 | E11 | E12 | E13 | E14 | C4 | C5 |
|---|---|---|---|---|---|---|---|---|---|---|---|---|---|---|
| Zinc laurate | 0.5 | 0.5 | 0.5 | 0.5 | 0.5 | 0.5 | 0.5 | 0.5 | 0.5 | 0.5 | 0.5 | 0.5 | 0.5 | 0.5 |
| Magnesia | 5 | 5 | 5 | 5 | 5 | 5 | 5 | 5 | 5 | 5 | 5 | 5 | 5 | 5 |
| Petroleum type solvent *4 | 3000 | | 3000 | | 3000 | | 3000 | | 3000 | | 3000 | | 3000 | |
| Surfactant *10 | | 10 | | 10 | | 10 | | 10 | | 10 | | 10 | | 10 |
| Water | | 2000 | | 2000 | | 2000 | | 2000 | | 2000 | | 2000 | | 2000 |
| Cycle Number | 1–2 | 1–2 | 35–40 | 35–40 | 50–70 | 50–70 | 40 | 40 | 45 | 45 | 25–30 | 25–30 | 2–3 | 2–3 |
| Evaluation | XX | XX | O | O | O | O | O | O | O | O | O | O | XX | XX |

"E" indicates Example and "C" indicates Comparative Example.
*1: viscosity (25° C.) = 1.0 × 10⁵ (cst)
*2: viscosity (25° C.) = 30 (cst)
*3: particle diameter = 25 μm
*4: boiling point = 50–60° C.
*10: Polyethylene glycol monostearate (molecular weight 400)

TABLE 7

| Example and Comparative Example | E15 | E16 | C6 | C7 | C8 | C9 |
|---|---|---|---|---|---|---|
| Polydimethyl siloxane *1 | 100 | 100 | | | | |
| Polydimethyl siloxane *11 | | | 100 | 100 | | |
| Polydimethyl siloxane *12 | | | | | 100 | 100 |
| Polymethylhydrogen siloxane *2 | 60 | 60 | 60 | 60 | 60 | 60 |
| Finely powderous silica *3 | 6 | 6 | 6 | 6 | 6 | 6 |
| Zinc laurate | 0.5 | 0.5 | 0.5 | 0.5 | 0.5 | 0.5 |
| Magnesia | 5 | 5 | 5 | 5 | 5 | 5 |
| Petroleum type solvent *4 | 3000 | | 3000 | | 3000 | |
| Surfactant *10 | | 10 | | 10 | | 10 |
| Water | | 2000 | | 2000 | | 2000 |
| Cycle Number | 50–70 | 50–70 | G 7–8 → CA 9–11 | G 7–8 → CA 9–11 | 1–3 | 2–4 |
| Evaluation | O | O | X | X | XX | XX |

*1: viscosity (25° C.) = 1.0 × 10⁵ (cst)
*11: viscosity (25° C.) = 3.0 × 10⁷ (cst)
*12: viscosity (25° C.) = 300 (cst)

TABLE 8

| Example and Comparative Example | C10 | C11 | E17 | E18 | E19 | E20 | E21 | E22 | C12 | C13 |
|---|---|---|---|---|---|---|---|---|---|---|
| Polydimethyl siloxane *1 | 100 | 100 | 100 | 100 | 100 | 100 | 100 | 100 | 100 | 100 |
| Polymethylhydrogen siloxane *2 | 60 | 60 | 60 | 60 | 60 | 60 | 60 | 60 | 60 | 60 |
| Finely powderous silica *3 | 0 | 0 | 3 | 3 | 6 | 6 | 18 | 18 | 35 | 35 |
| Zinc laurate | 0.5 | 0.5 | 0.5 | 0.5 | 0.5 | 0.5 | 0.5 | 0.5 | 0.5 | 0.5 |
| Magnesia | 5 | 5 | 5 | 5 | 5 | 5 | 5 | 5 | 5 | 5 |
| Petroleum type solvent *4 | 3000 | | 3000 | | 3000 | | 3000 | | 3000 | |
| Surfactant *10 | | 10 | | 10 | | 10 | | 10 | | 10 |
| Water | | 2000 | | 2000 | | 2000 | | 2000 | | 2000 |
| Cycle Number | G 4–5 → CA 9–13 | G 4–5 → CA 9–13 | 50–65 | 50–65 | 50–70 | 50–70 | 25–45 | 25–45 | u.m. | u.m. |
| Evaluation | X | X | O | O | O | O | O | O | XX | XX | u.m.: unmeasurable because of precipitation of silica

TABLE 9

| Example and Comparative Example | E23 | E24 | C14 | C15 | C16 | C17 | C18 | C19 |
|---|---|---|---|---|---|---|---|---|
| Polydimethyl siloxane *1 | 100 | 100 | 100 | 100 | 100 | 100 | | |
| Polydimethyl siloxane *11 | | | | | | | 40.4 | 40.4 |
| Polymethylhydrogen siloxane *2 | 60 | 60 | | | | | | |
| Methyl hydrogen silane | | | 60 | | | | 175.0 | 175.0 |
| Dimethylhydrogen silane | | | | 60 | | | | |
| Methyl trimethoxy silane | | | | | 60 | 60 | | |
| Zinc laurate | 0.5 | 0.5 | 0.5 | 0.5 | 0.5 | 0.5 | | |
| Zinc acetate | | | | | | | 43.7 | 43.7 |
| Zinc stearate | | | | | | | 43.7 | 43.7 |

TABLE 9-continued

| Example and Comparative Example | E23 | E24 | C14 | C15 | C16 | C17 | C18 | C19 |
|---|---|---|---|---|---|---|---|---|
| Magnesia | 5 | 5 | 5 | 5 | 5 | 5 | | |
| Finely powderous silica *3 | 6 | 6 | 6 | 6 | 6 | 6 | | 6 |
| Petroleum type solvent *4 | 3000 | | 3000 | 3000 | 3000 | | | |
| Surfactant *10 | | 10 | | | | 10 | 15 | 15 |
| Water | | 2000 | | | | 2000 | 610.8 | 610.8 |
| Defoamer *9 | | | | | | | 1.3 | 1.3 |
| Cycle Number | 50–70 | 50–70 | 4–5 | 4–5 | 1–2 | 1–2 | 8–16 | G 7–8 → CA 11–13 |
| Evaluation | O | O | X | X | XX | XX | X | X |

What is claimed is:

1. A method of molding and vulcanizing an unvulcanized rubber product by using a curing bladder, wherein said curing bladder is treated at the surface thereof with a silicone composition, said method comprising the steps of:
applying said silicone composition to the surface of said curing bladder; placing an unvulcanized rubber product into a mold; conforming said unvulcanized rubber product to an internal surface of said mold by internally pressurizing said curing bladder into contact with a surface of said vulcanized rubber product; applying heat and curing said unvulcanized rubber product to form a vulcanized rubber product having a predetermined shape dictated by said mold; the improvement comprising applying said silicone composition comprising:
(a) 100 parts by weight of a polyorganosiloxane having a viscosity at 25° C. of from 3,000 to 5,000,000 cst, said polyorganosiloxane having organic groups bonded to the silicon atoms of said polyorganosiloxane, said organic groups being selected from the group consisting of methyl, ethyl, propyl, butyl, pentyl, hexyl, octyl, decyl, vinylphenyl, β-phenylethyl, β-phenylpropyl, chloromethyl, chlorophenyl and 3,3,3-trifluoropropyl, and wherein more than 90 mol % of said organic groups are methyl;
(b) from 30 to 300 parts by weight of a polymethylhydrogensiloxane having a viscosity at 25° C. of from 10 to 70 cst;
(c) from 2 to 25 parts by weight of finely powderous silica, and
(d) from 0 to 30 parts by weight of an organic acid salt of one or more metals selected from the group consisting of zinc, magnesium, manganese and cobalt, and wherein said polyorganosiloxane (a) and said polymethylhydrogensiloxane (b) make up the silicone component of said silicone composition; and, the improvement further comprising the steps of said method being executed successively for more than 40 of said vulcanized rubber products without reapplication of said silicone composition to said surface of said curing bladder.

2. The method of molding and vulcanizing said rubber product as defined in claim 1, wherein said polyorganosiloxane has a viscosity at 25° C. of from 9,000 to 2,000,000.

3. The method of molding and vulcanizing said rubber product as defined in claim 1, wherein said polyorganosiloxane has a viscosity at 25° C. of from 10,000 to 1,000,000.

4. The method of molding and vulcanizing said rubber product as defined in claim 1, wherein said polymethylhydrogensiloxane has a viscosity at 25° C. of from 30 to 60 cst.

5. The method of molding and vulcanizing said rubber product as defined in claim 1, wherein said polymethylhydrogensiloxane is from 70 to 180 parts by weight based on 100 parts by weight of said polyorganosiloxane (a).

6. The method of molding and vulcanizing said rubber product as defined in claim 1, wherein said finely powderous silica (c) has a particle size from 10 to 30 μm.

7. The method of molding and vulcanizing said rubber product as defined in claim 1, wherein said finely powderous silica (c) is from 3 to 15 parts by weight based on 100 parts of said polyorganosiloxane (a).

8. The method of molding and vulcanizing said rubber product as defined in claim 1, wherein the silicone composition is applied as a surface treating silicone solution.

9. The method of molding and vulcanizing said rubber product as defined in claim 8, wherein the concentration of said silicone composition is from 2 to 45 % by weight of the surface treating silicone solution.

10. The method of molding and vulcanizing said rubber product as defined in claim 9, wherein the concentration of said silicone composition is from 5 to 40 % by weight for said surface treating silicone composition and is in the form of an aqueous emulsion 11. The method of molding and vulcanizing said rubber product as defined in claim 9, wherein the concentration of said silicone composition is from 2 to 25 % by weight for said surface treating silicone composition and is in the form of an organic solvent solution.

12. The method of molding and vulcanizing said rubber product as defined in claim 1, wherein said more than 40 unvulcanized rubber products are molded and vulcanized successively with said bladder treated with said silicone composition without any additional releasing agents and thereafter, said silicone composition is reapplied to said surface of said curing bladder and more than 40 additional unvulcanized rubber products are successively molded and vulcanized without any additional releasing agents and without any interim reapplication of said silicone composition to said surface of said curing bladder.

* * * * *